(12) United States Patent
Henze et al.

(10) Patent No.: US 10,815,376 B2
(45) Date of Patent: Oct. 27, 2020

(54) FLAME-RETARDANT THERMOPLASTIC POLYURETHANE

(71) Applicant: BASF SE, Ludwigshafen am Rhein (DE)

(72) Inventors: Oliver Steffen Henze, Lemfoerde (DE); Oliver Muehren, Bramsche (DE)

(73) Assignee: BASF SE, Ludwigshafen am Rhein (DE)

( * ) Notice: Subject to any disclaimer, the term of this patent is extended or adjusted under 35 U.S.C. 154(b) by 107 days.

(21) Appl. No.: 15/753,752

(22) PCT Filed: Aug. 17, 2016

(86) PCT No.: PCT/EP2016/069488
§ 371 (c)(1),
(2) Date: Feb. 20, 2018

(87) PCT Pub. No.: WO2017/032658
PCT Pub. Date: Mar. 2, 2017

(65) Prior Publication Data
US 2018/0265698 A1    Sep. 20, 2018

(30) Foreign Application Priority Data
Aug. 21, 2015  (EP) .................................... 15181935

(51) Int. Cl.
| C08L 75/04 | (2006.01) |
| C08K 5/3492 | (2006.01) |
| C08K 5/521 | (2006.01) |
| C08K 5/5313 | (2006.01) |
| H01B 3/30 | (2006.01) |
| C08K 5/5317 | (2006.01) |

(52) U.S. Cl.
CPC .......... *C08L 75/04* (2013.01); *C08K 5/34924* (2013.01); *C08K 5/521* (2013.01); *C08K 5/5313* (2013.01); *C08K 5/5317* (2013.01); *H01B 3/302* (2013.01); *C08L 2201/02* (2013.01)

(58) Field of Classification Search
None
See application file for complete search history.

(56) References Cited

U.S. PATENT DOCUMENTS

| 4,314,927 A | 2/1982 | Theysohn et al. |
| 5,691,404 A | 11/1997 | Kasowski et al. |
| 6,207,736 B1 | 3/2001 | Nass et al. |
| 6,255,371 B1 | 7/2001 | Schlosser et al. |
| 6,365,071 B1 | 4/2002 | Jenewein et al. |
| 6,509,401 B1 | 1/2003 | Jenewein et al. |
| 6,547,992 B1 | 4/2003 | Schlosser et al. |
| 2003/0166749 A1 | 9/2003 | Eckstein et al. |
| 2005/0203244 A1 | 9/2005 | Hackl et al. |
| 2008/0167408 A1* | 7/2008 | Siddhamalli ........... C08K 5/053 524/133 |
| 2010/0324183 A1* | 12/2010 | Henze .................. C08K 5/0066 524/101 |
| 2011/0190407 A1* | 8/2011 | Balbo Block .......... C08J 9/0033 521/108 |
| 2013/0059955 A1 | 3/2013 | Tai et al. |
| 2013/0081853 A1 | 4/2013 | Mundra et al. |
| 2015/0284536 A1* | 10/2015 | Henze .................. C08K 5/0066 524/101 |
| 2016/0083560 A1* | 3/2016 | Fudala ..................... C08K 3/32 524/101 |
| 2017/0066906 A1* | 3/2017 | Henze .................... H01B 7/295 |
| 2019/0270884 A1* | 9/2019 | Henze .................... C08K 5/521 |

FOREIGN PATENT DOCUMENTS

| DE | 101 03 424 A1 | 8/2002 |
| DE | 102 24 340 A1 | 12/2003 |
| EP | 0 019 768 A1 | 12/1980 |
| EP | 0 617 079 A2 | 9/1994 |
| EP | 0 922 552 A1 | 6/1999 |
| WO | WO 97/00916 A1 | 1/1997 |
| WO | WO 03/066723 A2 | 8/2003 |
| WO | WO 2006/072461 A1 | 7/2006 |
| WO | WO 2006/121549 A1 | 11/2006 |
| WO | WO 2014/179092 A1 | 11/2014 |
| WO | WO 2015/128213 A1 | 9/2015 |

OTHER PUBLICATIONS

International Search Report dated Oct. 12, 2016 in PCT/EP2016/069488, 2 pages.

(Continued)

*Primary Examiner* — Joseph D Anthony
(74) *Attorney, Agent, or Firm* — Oblon, McClelland, Maier & Neustadt, L.L.P.

(57) ABSTRACT

The present invention relates to compositions comprising at least one thermoplastic polyurethane, at least melamine cyanurate, at least one first phosphorus-containing flame retardant (F1) selected from the group consisting of alkyl esters of phosphoric acid and alkyl esters of phosphonic acid, where the alkyl radicals are selected from C1 to C12 alkyl radicals, and at least one further phosphorus-containing flame retardant (F2) selected from the group consisting of derivatives of phosphinic acid, and to the use of such a composition for production of cable sheaths.

20 Claims, No Drawings

(56) References Cited

OTHER PUBLICATIONS

International Preliminary Report on Patentability and Written Opinion dated Mar. 8, 2018 in PCT/EP2016/069488 (with English language translation), 16 pages.
Vieweg, R. et al. "Polyurethane", Kunststoff-Handbuch, Carl Hanser Verlag, vol. 2, 1966, pp. 96-120 (with cover pages).
U.S. Appl. No. 15/106,663, filed Jun. 20, 2016, US 2017/0002199 A1, Oliver Steffen Henze et al.
U.S. Appl. No. 15/106,677, filed Jun. 20, 2016, US 2017/0002179 A1, Oliver Steffen Henze et al.
U.S. Appl. No. 15/310,567, filed Nov. 11, 2016, US 2017/0081502 A1, Oliver Steffen Henze et al.
U.S. Appl. No. 15/310,574, filed Nov. 11, 2016, US 2017/0096546 A1, Oliver Steffen Henze et al.
U.S. Appl. No. 15/753,619, filed Feb. 20, 2018, Oliver Steffen Henze et al.

\* cited by examiner

FLAME-RETARDANT THERMOPLASTIC POLYURETHANE

This application is a National Phase of PCT/EP2016/069488, which was filed on Aug. 17, 2016. This application is based upon and claims the benefit of priority to European Application No. 15181935.6, which was filed on Aug. 21, 2015.

The present invention relates to compositions comprising at least one thermoplastic polyurethane, at least melamine cyanurate, at least one first phosphorus-containing flame retardant (F1) selected from the group consisting of alkyl esters of phosphoric acid and alkyl esters of phosphonic acid, where the alkyl radicals are selected from C1 to C12 alkyl radicals, and at least one further phosphorus-containing flame retardant (F2) selected from the group consisting of derivatives of phosphinic acid. The present invention further relates to the use of such compositions for production of cable sheaths.

Cables produced from PVC have the disadvantage of evolving toxic gases on combustion. Therefore, products based on thermoplastic polyurethanes are being developed, these having lower smoke gas toxicities and having good mechanical properties, abrasion resistance and flexibility. Because of the inadequate flammability performance, compositions based on thermoplastic polyurethanes are being developed, these comprising various flame retardants.

Flame-retardant thermoplastic polyurethanes find use particularly in cable production as cable sheaths. A common requirement here is for thin cables having thin cable sheaths which both pass the relevant flame tests (e.g. VW1) and have adequate mechanical properties.

In these cases, it is possible to add both halogenated and halogen-free flame retardants to the thermoplastic polyurethanes (TPUs). The thermoplastic polyurethanes comprising halogen-free flame retardants generally have the advantage of evolving less toxic and less corrosive smoke gases when burnt. Halogen-free flame-retardant TPUs are described, for example, in EP 0 617 079 A2, WO 2006/121549 A1 or WO 03/066723 A2. US 2013/0059955 A1 also discloses halogen-free TPU compositions comprising phosphate-based flame retardants.

US 2013/0081853 A1 relates to compositions, preferably halogen-free flame-retardant compositions, comprising a TPU polymer and a polyolefin, and also phosphorus-based flame retardants and further additives. According to US 2013/0081853 A1, the compositions have good mechanical properties.

Melamine cyanurate has also long been known as a flame retardant for industrial plastics. It finds wide use especially in polyamides, but also in polyesters and other plastics such as styrene-based polymers. For instance, WO 97/00916 A describes melamine cyanurate in combination with tungstic acid/tungstic salts as flame retardant for aliphatic polyamides. EP 0 019 768 A1 discloses flameproofing polyamides with a mixture of melamine cyanurate and red phosphorus.

According to WO 03/066723, materials comprising only melamine cyanurate as flame retardant, in the case of low wall thicknesses, have neither a good limiting oxygen index (LOI) nor good flame retardancy, determined, for example, by performance in a UL 94 test.

WO 2006/121549 A1 also describes materials comprising, as flame retardant, a combination of melamine polyphosphate, phosphinate and borate. These materials do attain high LOI values at low wall thicknesses, but do not attain good results in the UL 94 test.

There are also various known thermoplastic polyurethanes which comprise, as flame retardants, combinations of melamine cyanurate in conjunction with phosphorus compounds. EP 0 617 079 A2 and DE 102 24 340 A1 disclose materials that exhibit good performance in the UL 94 test (particularly in the UL 94V test), but at the same time have low LOI values.

For example, materials which comprise, as flame retardants, combinations of melamine cyanurate with phosphonic esters and phosphonic esters have good results in UL 94V tests, but very low LOI values, for example <25%. Such combinations of melamine cyanurate with phosphoric esters and phosphonic esters are inadequate as flame retardants particularly in the case of sheaths of thin cables. For various flame retardancy applications, a high LOI value is required in standards, for example in DIN EN 45545.

By contrast, very high LOI values (>30%) can be achieved with combinations of melamine cyanurate with phosphinates, but not good results in the UL 94V test. Corresponding materials are disclosed, for example, by U.S. Pat. Nos. 6,207,736 B1, 6,255,371, 6,365,071 B1, 6,509,401 B1 and 6,547,992 B1.

Accordingly, the compositions known from the prior art either do not exhibit adequate mechanical properties or have only inadequate flammability properties, for example flame retardancy and performance, in the UL 94V test.

PCT/EP2015/053192 discloses compositions comprising a thermoplastic polyurethane, melamine cyanurate and a combination of phosphorus-containing flame retardants. According to PCT/EP2015/053192, these compositions have the advantage of good flame retardancy combined with good mechanical properties and good chemical stability.

For many applications, however, good characteristics with regard to discoloration under the influence of UV are also required. This is relevant, for example, when materials are being used in construction in visible regions or cables that are exposed to insolation are being sheathed.

Proceeding from the prior art, it was accordingly an object of the present invention to provide flame-retardant thermoplastic polyurethanes which have good mechanical properties, exhibit good flame retardancy properties, simultaneously have good mechanical and chemical stability and additionally are discolored to a minor degree, if at all, when subjected to UV irradiation.

According to the invention, this object is achieved by a composition comprising at least one thermoplastic polyurethane, at least melamine cyanurate, at least one first phosphorus-containing flame retardant (F1) selected from the group consisting of alkyl esters of phosphoric acid and alkyl esters of phosphonic acid, where the alkyl radicals are selected from C1 to C12 alkyl radicals and at least one further phosphorus-containing flame retardant (F2) selected from the group consisting of derivatives of phosphinic acid.

The compositions of the invention comprise at least one thermoplastic polyurethane and also melamine cyanurate and a combination of two phosphorus-containing flame retardants (F1) and (F2).

It has been found that, surprisingly, the compositions of the invention have properties improved over the compositions known from the prior art, for example elevated flame retardancy and are especially discolored only to a minor degree, if at all, when subjected to UV irradiation.

The compositions of the invention comprise melamine cyanurate. It has been found that, surprisingly, the compositions of the invention have an optimized profile of properties as a result of the combination of the components of the invention, especially for use as cable sheathing.

Melamine cyanurate in the context of this application is understood to mean, inter alia, all standard commercial and commercially available solid, preferably particulate, product qualities. Examples of these include Melapur MC 25 (BASF SE) and Budit 315 (Budenheim).

According to the invention, melamine cyanurate is preferably used in the form of a 1:1 salt of melamine and cyanuric acid. The melamine excess here is, for example, less than 0.2%, preferably less than 0.15%, further preferably less than 0.1%. According to the invention, the cyanuric acid excess is, for example, less than 0.25%, preferably less than 0.2%, further preferably less than 0.15%.

In the context of the present invention, it is likewise possible that the melamine cyanurate used has been treated, for example with an organic compound. Corresponding materials are known in principle from the prior art.

The melamine cyanurate which is suitable in accordance with the invention preferably consists of particles typically having a mean particle diameter of 0.1 µm to 100 µm, preferably 0.5 µm to 60 µm, more preferably 1 µm to 10 µm. The particle size distribution in the context of the present invention may be monomodal or else multimodal, for example bimodal.

In a further embodiment, the present invention therefore relates to a composition as described above, wherein the melamine cyanurate has a particle size in the range from 0.1 to 100 µm.

Melamine cyanurate is present in suitable amounts in the composition of the invention. For example, the proportion of melamine cyanurate in the composition is in the range from 20% to 40% by weight, based on the overall composition, preferably composition in the range from 25% to 35% by weight, based on the overall composition, especially composition in the region of about 30% by weight, based on the overall composition.

In a further embodiment, the present invention therefore relates to a composition as described above, wherein the proportion of the melamine cyanurate in the composition is in the range from 20% to 40% by weight based on the overall composition.

The sum total of the components of the composition is 100% by weight in each case.

The composition of the invention further comprises at least one thermoplastic polyurethane. Thermoplastic polyurethanes are known in principle. They are typically prepared by reacting the components (a) isocyanates and (b) compounds reactive toward isocyanates and optionally (c) chain extenders, optionally in the presence of at least one (d) catalyst and/or (e) customary auxiliaries and/or additives. The components (a) isocyanate, (b) compounds reactive toward isocyanates, (c) chain extenders are also referred to, individually or collectively, as formation components.

In the context of the present invention, the isocyanates and compounds reactive toward isocyanates which are customarily used are suitable in principle.

Organic isocyanates (a) used are preferably aliphatic, cycloaliphatic, araliphatic and/or aromatic isocyanates, further preferably tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyl diphenyl diisocyanate, 1,2-diphenylethane diisocyanate and/or phenylene diisocyanate. Particular preference is given to using 4,4'-MDI.

In a further embodiment, the present invention therefore relates to a composition as described above, wherein the thermoplastic polyurethane is based on diphenylmethane diisocyanate (MDI).

Compounds (b) reactive toward isocyanates used may in principle be any suitable compounds known to those skilled in the art. As compound (b) reactive toward isocyanates, in accordance with the invention, at least one diol is used.

It is possible here in the context of the present invention to use any suitable diols, for example polyether diols or polyester diols or mixtures of two or more thereof.

In principle, it is possible in accordance with the invention to use any suitable polyester diols, the term "polyester diol" in the context of the present invention also comprising polycarbonatediols.

In one embodiment of the present invention, a polycarbonatediol or a polytetrahydrofuran polyol is used. Suitable polytetrahydrofuran polyols have, for example, a molecular weight in the range from 500 to 5000 g/mol, preferably 500 to 2000 g/mol, more preferably 800 to 1200 g/mol.

Suitable polycarbonatediols are, for example, polycarbonatediols based on alkanediols. Suitable polycarbonatediols are strictly difunctional OH-functional polycarbonatediols, preferably strictly difunctional OH-functional aliphatic polycarbonatediols. Suitable polycarbonatediols are based, for example, on butane-1,4-diol, pentane-1,5-diol or hexane-1,6-diol, especially butane-1,4-diol, pentane-1,5-diol, hexane-1,6-diol, 3-methylpentane-1,5-diol or mixtures thereof, more preferably butane-1,4-diol, pentane-1,5-diol, hexane-1,6-diol or mixtures thereof. Preference is given in the context of the present invention to using polycarbonatediols based on butane-1,4-diol and hexane-1,6-diol, polycarbonatediols based on pentane-1,5-diol and hexane-1,6-diol, polycarbonatediols based on hexane-1,6-diol, and mixtures of two or more of these polycarbonatediols.

The compositions of the invention preferably comprise at least one thermoplastic polyurethane selected from the group consisting of thermoplastic polyurethanes based on at least one diisocyanate and at least one polycarbonatediol and thermoplastic polyurethanes based on at least one diisocyanate and polytetrahydrofuran polyol. Accordingly, the polyurethanes present in the compositions of the invention are prepared using, as component (b), at least one polycarbonatediol or a polytetrahydrofuran polyol.

In a further embodiment, the present invention therefore relates to a composition as described above, wherein the thermoplastic polyurethane is selected from the group consisting of thermoplastic polyurethanes based on at least one diisocyanate and at least one polycarbonatediol, and thermoplastic polyurethanes based on at least one diisocyanate and polytetrahydrofuran polyol.

In a further embodiment, the present invention also relates to a composition as described above, wherein the thermoplastic polyurethane is a thermoplastic polyurethane based on at least one diisocyanate and at least one polycarbonatediol. Preferably, the polycarbonatediols used have a number-average molecular weight Mn in the range from 500 to 4000 g/mol, determined via GPC, preferably in the range from 650 to 3500 g/mol, determined via GPC, more preferably in the range from 800 to 3000 g/mol, determined via GPC.

The present invention further relates, in a further embodiment, also to a composition as described above, wherein the thermoplastic polyurethane is a thermoplastic polyurethane based on at least one diisocyanate and at least one polycarbonatediol and the at least one polycarbonatediol is selected from the group consisting of polycarbonatediols based on butane-1,4-diol and hexane-1,6-diol, polycarbonatediols based on pentane-1,5-diol and hexane-1,6-diol, polycarbonatediols based on hexane-1,6-diol, and mixtures of two or more of these polycarbonatediols. Further preferred are copolycarbonatediols based on the diols pentane-1,5-diol and hexane-1,6-diol, preferably having a molecular weight Mn of about 2000 g/mol.

In a further embodiment, the present invention therefore relates to a composition as described above, wherein the polycarbonatediol has a number-average molecular weight Mn in the range from 500 to 4000 g/mol, determined via GPC, preferably in the range from 1000 to 3500 g/mol, determined via GPC, further preferably in the range from 1500 to 3000 g/mol, determined via GPC.

Chain extenders (c) used may preferably be aliphatic, araliphatic, aromatic and/or cycloaliphatic compounds having a molecular weight of 0.05 kg/mol to 0.499 kg/mol, preferably difunctional compounds, for example diamines and/or alkanediols having 2 to 10 carbon atoms in the alkylene radical, di-, tri-, tetra-, penta-, hexa-, hepta-, octa-, nona- and/or decaalkylene glycols having 3 to 8 carbon atoms, especially 1,2-ethylene glycol, propane-1,3-diol, butane-1,4-diol, hexane-1,6-diol, preferably corresponding oligo- and/or polypropylene glycols, where it is also possible to use mixtures of the chain extenders. Preferably, the compounds (c) have only primary hydroxyl groups; most preferred is butane-1,4-diol.

Catalysts (d) which accelerate particularly the reaction between the NCO groups of the diisocyanates (a) and the hydroxyl groups of the compound (b) reactive toward isocyanates and the chain extender (c), in a preferred embodiment, are tertiary amines, especially triethylamine, dimethylcyclohexylamine, N-methylmorpholine, N,N'-dimethylpiperazine, 2-(dimethylaminoethoxy)ethanol, diazabicyclo[2.2.2]octane; in another preferred embodiment, these are organic metal compounds such as titanic esters, iron compounds, preferably iron(III) acetylacetonate, tin compounds, preferably tin diacetate, tin dioctoate, tin dilaurate or the dialkyltin salts of aliphatic carboxylic acids, preferably dibutyltin diacetate, dibutyltin dilaurate, or bismuth salts in which bismuth is preferably in the 2 or 3 oxidation state, especially 3. Preference is given to salts of carboxylic acids. Carboxylic acids used are preferably carboxylic acids having 6 to 14 carbon atoms, more preferably having 8 to 12 carbon atoms. Examples of suitable bismuth salts are bismuth(III) neodecanoate, bismuth 2-ethylhexanoate and bismuth octanoate.

The catalysts (d) are preferably used in amounts of 0.0001 to 0.1 part by weight per 100 parts by weight of the compound (b) reactive with isocyanates. Preference is given to using tin catalysts, especially tin dioctoate.

As well as catalysts (d), it is also possible to add customary auxiliaries (e) to the formation components (a) to (c). Examples include surface-active substances, fillers, further flame retardants, nucleating agents, oxidation stabilizers, gliding and demolding aids, dyes and pigments, optionally stabilizers, for example against hydrolysis, light, heat or discoloration, inorganic and/or organic fillers, reinforcing agents and plasticizers. Suitable auxiliaries and additives can be found, for example, in the Kunststoffhandbuch [Plastics Handbook], volume VII, published by Vieweg and Höchtlen, Carl Hanser Verlag, Munich 1966 (p. 103-113).

Suitable preparation processes for thermoplastic polyurethanes are disclosed, for example, in EP 0 922 552 A1, DE 101 03 424 A1 or WO 2006/072461 A1. The preparation is typically effected in a belt system or a reaction extruder, but can also be effected on the laboratory scale, for example in a manual casting method. Depending on the physical properties of the components, they are all mixed directly with one another or individual components are premixed and/or prereacted, for example to give prepolymers, and only then subjected to polyaddition. In a further embodiment, a thermoplastic polyurethane is first prepared from the formation components, optionally together with catalyst, into which auxiliaries may optionally also be incorporated. In that case, at least one flame retardant is introduced into this material and distributed homogeneously. The homogeneous distribution is preferably effected in an extruder, preferably in a twin-shaft extruder. To adjust the hardness of the TPUs, the amounts used of formation components (b) and (c) can be varied within relatively broad molar ratios, typically with rising hardness as the content of chain extender (c) increases.

For preparation of thermoplastic polyurethanes, for example those having a Shore A hardness of less than 95, preferably of 95 to 80 Shore A, more preferably about 85 A, it is possible, for example, to use the essentially difunctional polyhydroxyl compounds (b) and chain extenders (c) advantageously in molar ratios of 1:1 to 1:5, preferably 1:1.5 to 1:4.5, such that the resulting mixtures of the formation components (b) and (c) have a hydroxyl equivalent weight of greater than 200 and especially of 230 to 450, whereas, for preparation of harder TPUs, for example those having a Shore A hardness of greater than 98, preferably of 55 to 75 Shore D, the molar ratios of (b):(c) are in the range from 1:5.5 to 1:15, preferably from 1:6 to 1:12, such that the mixtures of (b) and (c) obtained have a hydroxyl equivalent weight of 110 to 200, preferably of 120 to 180.

In a further embodiment, the present invention therefore relates to a composition as described above, wherein the thermoplastic polyurethane has a Shore hardness in the range from 80 A to 100 A, determined in accordance with DIN 53505.

To prepare the thermoplastic polyurethanes of the invention, the formation components (a), (b) and (c) are preferably reacted in the presence of catalysts (d) and optionally auxiliaries and/or additives (e) in such amounts that the ratio of equivalents of NCO groups in the diisocyanates (a) to the sum total of the hydroxyl groups in the formation components (b) and (c) is 0.9 to 1.1:1, preferably 0.95 to 1.05:1 and especially about 1.0 to 1.04:1.

The composition of the invention comprises the at least one thermoplastic polyurethane in an amount in the range from 30% by weight to 75% by weight, based on the overall composition, especially in the range from 35% by weight to 75% by weight, based on the overall composition, preferably in the range from 40% by weight to 70% by weight, further preferably in the range from 45% by weight to 65% by weight and especially preferably in the range from 50% by weight to 60% by weight, based in each case on the overall composition.

In a further embodiment, the present invention therefore relates to a composition as described above, wherein the proportion of the thermoplastic polyurethane in the composition is in the range from 30% by weight to 75% by weight based on the overall composition.

The sum of all components of each composition adds up to 100% by weight.

Preference is given in accordance with the invention to preparing thermoplastic polyurethanes in which the thermoplastic polyurethane has a mean molecular weight ($M_W$) in the range from 50 000 to 500 000 Da. The upper limit for the mean molecular weight ($M_W$) of the thermoplastic polyurethanes is generally determined by the processability, and also the spectrum of properties desired. Further preferably, the thermoplastic polyurethane has a mean molecular weight ($M_W$) in the range from 75 000 to 400 000 Da, especially preferably in the range from 100 000 to 300 000 Da.

In a further embodiment, the present invention therefore relates to a composition as described above, wherein the thermoplastic polyurethane has a mean molecular weight ($M_W$) in the range from 50 000 to 500 000 Da.

The compositions of the invention comprise, as well as the at least one thermoplastic polyurethane and melamine cyanurate, a combination of two phosphorus-containing flame retardants (F1) and (F2). The compositions of the invention comprise at least one first phosphorus-containing flame retardant (F1) selected from the group consisting of alkyl esters of phosphoric acid and alkyl esters of phosphonic acid, where the alkyl radicals are selected from C1 to C12 alkyl radicals, and at least one further phosphorus-containing flame retardant (F2) selected from the group consisting of derivatives of phosphinic acid.

According to the invention, the phosphorus-containing flame retardant (F1) is selected from the group consisting of alkyl esters of phosphoric acid and alkyl esters of phosphonic acid, where the alkyl radicals are selected from C1 to C12 alkyl radicals. For example, the phosphorus-containing flame retardant (F1) is selected from the group consisting of alkyl esters of phosphoric acid, where the alkyl radicals are selected from C1 to C12 alkyl radicals. Alternatively, the phosphorus-containing flame retardant (F1) may be selected from the group consisting of alkyl esters of phosphonic acid, where the alkyl radicals are selected from C1 to C12 alkyl radicals.

If the ester comprises more than one alkyl radical, the alkyl radicals may be the same or different. According to the invention, the alkyl radicals may be substituted or unsubstituted, for example halogenated. The alkyl radicals may be linear, branched or cyclic. In a preferred embodiment, the alkyl radicals are selected from C1 to C8 alkyl radicals, further preferably selected from C1 to C6 alkyl radicals.

Accordingly, the phosphorus-containing flame retardant (F1) is preferably selected from the group consisting of alkyl esters of phosphoric acid and alkyl esters of phosphonic acid, where the alkyl radicals are selected from C1 to C8 alkyl radicals. Further preferably, the phosphorus-containing flame retardant (F1) is preferably selected from the group consisting of alkyl esters of phosphoric acid and alkyl esters of phosphonic acid, where the alkyl radicals are selected from C1 to C6 alkyl radicals. In a further embodiment, the phosphorus-containing flame retardant (F1) is selected from the group consisting of alkyl esters of phosphoric acid, where the alkyl radicals are selected from C1 to C8 alkyl radicals, preferably selected from C1 to C6 alkyl radicals. In an alternative embodiment, the phosphorus-containing flame retardant (F1) is selected from the group consisting of alkyl esters of phosphonic acid, where the alkyl radicals are selected from C1 to C8 alkyl radicals, preferably selected from C1 to C6 alkyl radicals.

In a further preferred embodiment, the phosphorus-containing flame retardant (F1) is liquid at 21° C.

Preferably, the flame retardant (F1) comprises salts having an organic or inorganic cation or organic esters. Organic esters are derivatives of the phosphorus-containing acids in which at least one oxygen atom bonded directly to the phosphorus has been esterified with an organic radical. In a preferred embodiment, the organic ester is a dialkyl ester, and in another preferred embodiment a trialkyl ester. More preferably, all hydroxyl groups of the corresponding phosphorus-containing acid have been esterified.

In a further embodiment, the present invention therefore relates to a composition as described above, wherein the phosphorus-containing flame retardant (F1) is a trialkyl phosphate where the alkyl radicals are selected from C1 to C12 alkyl radicals.

Suitable alkyl radicals are, for example, methyl groups, ethyl groups, propyl groups, butyl groups, pentyl groups, hexyl groups, heptyl groups or octyl groups.

Organic phosphate esters are preferably the triesters of phosphoric acid, such as trialkyl phosphates. A suitable example in accordance with the invention is tris-(2-ethylhexyl) phosphate.

The organic phosphonates are salts with an organic or inorganic cation or the esters of phosphonic acid. Preferred esters of phosphonic acid are the diesters of alkyl phosphonic acids. Suitable alkyl radicals are those mentioned above.

Phosphonates suitable in accordance with the invention are, for example, methanephosphonates or spirophosphonates such as phosphonates of the general formula (I):

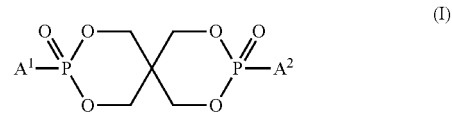

where $A^1$ and $A^2$ are independently a linear or branched alkyl radical having 1 to 4 carbon atoms, for example a linear or branched alkyl radical having 2 to 4 carbon atoms, preferably a methyl group, an ethyl group, an n-propyl group, an i-propyl group, an n-butyl group, an i-butyl group or a t-butyl group, further preferably a methyl group.

Accordingly, the present invention also relates, in a further embodiment, to a composition as described above, wherein the phosphorus-containing flame retardant (F1) is selected from the group consisting of trialkyl phosphates, methanephosphonates and phosphonates of the general formula (I):

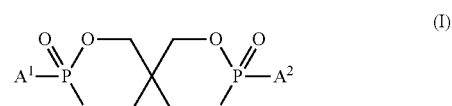

where $A^1$ and $A^2$ are independently a linear or branched alkyl radical having 1 to 4 carbon atoms, preferably a methyl group.

In a further embodiment, the present invention also relates to a composition as described above, wherein the phosphorus-containing flame retardant (F1) is tris(2-ethylhexyl) phosphate.

In a further embodiment, the present invention also relates to a composition as described above, wherein the phosphorus-containing flame retardant (F1) is dimethyl spirophosphate.

The proportion of the flame retardant (F1) in the composition of the invention is, for example, in the range from 2% to 15% by weight, based on the overall composition, preferably in the range from 3% to 10% by weight, based on the overall composition, especially in the range from 5% to 8% by weight, based on the overall composition.

In a further embodiment, the present invention therefore relates to a composition as described above, wherein the proportion of the flame retardant (F1) is in the range from 2% to 15% based on the overall composition.

Preferably, the flame retardant (F2) selected from derivatives of phosphinic acid comprises salts with an organic or inorganic cation or organic esters. Organic esters are derivatives of phosphinic acid in which at least one oxygen atom bonded directly to the phosphorus has been esterified with an organic radical. In a preferred embodiment, the organic ester is an alkyl ester, and in another preferred embodiment an aryl ester. More preferably, all hydroxyl groups of the phosphinic acid have been esterified.

Phosphinic esters have the general formula $R^1R^2(P=O)OR^3$ where all three organic groups $R^1$, $R^2$ and $R^3$ may be the same or different. The $R^1$, $R^2$ and $R^3$ radicals are either aliphatic or aromatic and have 1 to 20 carbon atoms, preferably 1 to 10 and further preferably 1 to 3.

Preferably, at least one of the radicals is aliphatic, preferably all the radicals are aliphatic, and most preferably $R^1$ and $R^2$ are ethyl radicals. Further preferably, $R^3$ is also an ethyl radical or a methyl radical. In a further preferred embodiment, $R^1$, $R^2$ and $R^3$ are simultaneously ethyl radical or methyl radicals.

Preference is also given to phosphinates, i.e. the salts of phosphinic acid. The $R^1$ and $R^2$ radicals are either aliphatic or aromatic and have 1 to 20 carbon atoms, preferably 1 to 10 and further preferably 1 to 3. Preferably, at least one of the radicals is aliphatic, preferably all the radicals are aliphatic, and most preferably $R^1$ and $R^2$ are ethyl radicals. Preferred salts of phosphinic acids are aluminum salts, calcium salts or zinc salts, further preferably aluminum salts or zinc salts. A preferred embodiment is diethylaluminum phosphinate.

In a further embodiment, the present invention therefore relates to a composition as described above, wherein the phosphorus-containing flame retardant (F2) is a phosphinate.

In a further embodiment, the present invention therefore relates to a composition as described above, wherein the phosphinate is selected from the group consisting of aluminum phosphinates and zinc phosphinates.

The proportion of the flame retardant (F2) in the composition of the invention is, for example, in the range from 3% to 15% by weight, based on the overall composition, especially 5% to 15% by weight, based on the overall composition, preferably in the range from 7% to 13% by weight, based on the overall composition, especially in the range from 9% to 11% by weight, based on the overall composition.

In a further embodiment, the present invention therefore relates to a composition as described above, wherein the proportion of the flame retardant (F2) in the composition is in the range from 3% to 15% by weight based on the overall composition.

In one embodiment, for preparation of the compositions of the invention, thermoplastic polyurethane, melamine cyanurate and flame retardants (F1) and (F2) are processed in one step. In other preferred embodiments, for preparation of the compositions of the invention, a reaction extruder, a belt system or other suitable apparatus is firstly used to prepare a thermoplastic polyurethane, preferably in pellet form, into which melamine cyanurate and the flame retardants (F1) and (F2) are then introduced in at least one further step, or else two or more steps.

The mixing of the thermoplastic polyurethane with the other components is effected in a mixing unit which is preferably an internal kneader or an extruder, preferably a twin-shaft extruder. In a preferred embodiment, at least one flame retardant introduced into the mixing unit in the at least one further step is in liquid form, i.e. in liquid form at a temperature of 21° C. In another preferred embodiment of the use of an extruder, the flame retardant introduced is at least partly liquid at a temperature that exists behind the intake point in flow direction of the material charge in the extruder.

According to the invention, the composition may comprise further flame retardants, for example including phosphorus-containing flame retardants. Preferably, the composition of the invention, however, aside from the melamine cyanurate and the phosphorus-containing flame retardants (F1) and (F2), does not comprise any further flame retardants.

The combination of the various flame retardants optimizes mechanical properties and flame retardancy properties in accordance with the invention.

In this case, the mass ratio of the sum total of the phosphorus-containing flame retardants (F1) and (F2) present in the composition to the melamine cyanurate present in the composition, in accordance with the invention, is in the range from 1:3 to 1:1, for example in the region of 1:2.

Accordingly, the present invention, in a further embodiment, also relates to a composition comprising at least one thermoplastic polyurethane, at least melamine cyanurate, at least one first phosphorus-containing flame retardant (F1) selected from the group consisting of alkyl esters of phosphoric acid and alkyl esters of phosphonic acid, where the alkyl radicals are selected from C1 to C12 alkyl radicals, and at least one further phosphorus-containing flame retardant (F2) selected from the group consisting of derivatives of phosphinic acid, wherein the proportion of the thermoplastic polyurethane in the composition is in the range from 30% to 75% by weight,
the proportion of the melamine cyanurate in the composition is in the range from 20% to 40% by weight,
the proportion of the flame retardant (F2) in the composition is in the range from 3% to 15% by weight, and
the proportion of the flame retardant (F1) is in the range from 2% to 15% by weight, based in each case on the overall composition, where the sum total of the components of the composition is 100% by weight.

According to the invention, the composition may comprise further constituents, for example standard auxiliaries and additives for thermoplastic polyurethanes. Preferably, the composition, aside from the melamine cyanurate, the at least one phosphorus-containing flame retardant (F1) and the at least one phosphorus-containing flame retardant (F2), does not comprise any further flame retardants. Further preferably, the composition of the invention comprises melamine cyanurate, exactly one phosphorus-containing flame retardant (F1) selected from the group consisting of alkyl esters of phosphoric acid and alkyl esters of phosphonic acid, where the alkyl radicals are selected from C1 to C12 alkyl radicals, and exactly one phosphorus-containing flame retardant (F2) selected from the group consisting of derivatives of phosphinic acid.

The present invention also relates to the use of the composition of the invention comprising at least one flame-retardant thermoplastic polyurethane as described above for production of coatings, damping elements, bellows, films or fibers, shaped bodies, floors for buildings and transport, nonwovens, preferably seals, rollers, shoe soles, hoses, cables, cable connectors, cable sheaths, cushions, laminates, profiles, belts, saddles, foams, plug connectors, trailing cables, solar modules, automobile trim. Preference is given to the use for production of cable sheaths. The production is preferably effected from pellets, by injection molding, calendering, powder sintering or extrusion and/or by additional foaming of the composition of the invention.

Accordingly, the present invention also relates to the use of a composition comprising at least one thermoplastic polyurethane, at least melamine cyanurate, at least one first phosphorus-containing flame retardant (F1) selected from the group consisting of derivatives of phosphoric acid and derivatives of phosphonic acid and at least one further phosphorus-containing flame retardant (F2) selected from the group consisting of derivatives of phosphinic acid as described above for production of cable sheaths.

Further embodiments of the present invention can be inferred from the claims and the examples. It will be appreciated that the features of the inventive subject matter/process or of the inventive uses which have been mentioned above and those elucidated below can be used not only in the combination specified in each case but also in other combinations, without leaving the scope of the invention. For example, the combination of a preferred feature with an especially preferred feature or of a feature which is not characterized any further with an especially preferred feature, etc., is implicitly also encompassed even if this combination is not mentioned explicitly.

Listed hereinafter are illustrative embodiments of the present invention, though these do not restrict the present invention. More particularly, the present invention also encompasses those embodiments which arise from the dependency references and hence combinations specified hereinafter.

1. A composition comprising at least one thermoplastic polyurethane, at least melamine cyanurate, at least one first phosphorus-containing flame retardant (F1) selected from the group consisting of alkyl esters of phosphoric acid and alkyl esters of phosphonic acid, where the alkyl radicals are selected from C1 to C12 alkyl radicals, and at least one further phosphorus-containing flame retardant (F2) selected from the group consisting of derivatives of phosphinic acid.
2. The composition according to embodiment 1, wherein the phosphorus-containing flame retardant (F2) is a phosphinate.
3. The composition according to embodiment 2, wherein the phosphinate is selected from the group consisting of aluminum phosphinates and zinc phosphinates.
4. The composition according to any of embodiments 1 to 3, wherein the phosphorus-containing flame retardant (F1) is a trialkyl phosphate where the alkyl radicals are selected from C1 to C12 alkyl radicals.
5. The composition according to any of embodiments 1 to 3, wherein the flame retardant (F1) is selected from the group consisting of trialkyl phosphates, methanephosphonates and phosphonates of the general formula (I):

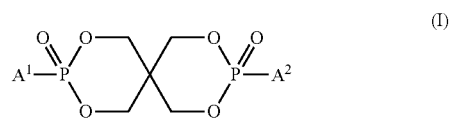

where $A^1$ and $A^2$ are independently a linear or branched alkyl radical having 1 to 4 carbon atoms.
6. The composition according to any of embodiments 1 to 5, wherein the melamine cyanurate has a particle size in the range from 0.1 to 100 μm.
7. The composition according to any of embodiments 1 to 6, wherein the thermoplastic polyurethane is selected from the group consisting of thermoplastic polyurethanes based on at least one diisocyanate and at least one polycarbonatediol, and thermoplastic polyurethanes based on at least one diisocyanate and polytetrahydrofuran polyol.
8. The composition according to any of embodiments 1 to 7, wherein the thermoplastic polyurethane has a mean molecular weight ($M_w$) in the range from 50 000 to 500 000 Da.
9. The composition according to any of embodiments 1 to 8, wherein the thermoplastic polyurethane is based on diphenylmethane diisocyanate (MDI).
10. The composition according to any of embodiments 1 to 9, wherein the thermoplastic polyurethane has a Shore hardness in the range from 80 A to 100 A, determined in accordance with DIN 53505.
11. The composition according to any of embodiments 1 to 10, wherein the proportion of the thermoplastic polyurethane in the composition is in the range from 30% by weight to 75% by weight based on the overall composition.
12. The composition according to any of embodiments 1 to 11, wherein the proportion of the melamine cyanurate in the composition is in the range from 20% to 40% by weight based on the overall composition.
13. The composition according to any of embodiments 1 to 12, wherein the proportion of the flame retardant (F2) in the composition is in the range from 3% to 15% by weight based on the overall composition.
14. The composition according to any of embodiments 1 to 13, wherein the proportion of the flame retardant (F1) is in the range from 2% to 15% by weight based on the overall composition.
15. The use of a composition according to any of embodiments 1 to 14 for production of cable sheaths.
16. A composition comprising at least one thermoplastic polyurethane, at least melamine cyanurate, at least one first phosphorus-containing flame retardant (F1) selected from the group consisting of alkyl esters of phosphoric acid, where the alkyl radicals are selected from C1 to C12 alkyl radicals and at least one further phosphorus-containing flame retardant (F2) selected from the group consisting of derivatives of phosphinic acid.
17. The composition according to embodiment 16, wherein the phosphorus-containing flame retardant (F2) is a phosphinate.
18. The composition according to embodiment 17, wherein the phosphinate is selected from the group consisting of aluminum phosphinates and zinc phosphinates.
19. The composition according to any of embodiments 16 to 18, wherein the phosphorus-containing flame retardant (F1) is a trialkyl phosphate where the alkyl radicals are selected from C1 to C12 alkyl radicals.

20. The composition according to any of embodiments 16 to 19, wherein the flame retardant (F1) is selected from the group consisting of trialkyl phosphates.
21. The composition according to any of embodiments 16 to 20, wherein the melamine cyanurate has a particle size in the range from 0.1 to 100 μm.
22. The composition according to any of embodiments 16 to 21, wherein the thermoplastic polyurethane is selected from the group consisting of thermoplastic polyurethanes based on at least one diisocyanate and at least one polycarbonate diol, and thermoplastic polyurethanes based on at least one diisocyanate and polytetrahydrofuran polyol.
23. The composition according to any of embodiments 16 to 22, wherein the thermoplastic polyurethane has an average molecular weight ($M_W$) in the range from 50 000 to 500 000 Da.
24. The composition according to any of embodiments 16 to 23, wherein the thermoplastic polyurethanes based on diphenylmethane diisocyanate (MDI).
25. The composition according to any of embodiments 16 to 24, wherein the thermoplastic polyurethane has a Shore hardness in the range from 80 A to 100 A, determined according to DIN 53505.
26. The composition according to any of embodiments 16 to 25, wherein the proportion of the thermoplastic polyurethane in the composition is in the range from 30% to 75% by weight based on the overall composition.
27. The composition according to any of embodiments 16 to 26, wherein the proportion of the melamine cyanurate in the composition is in the range from 20% to 40% by weight based on the overall composition.
28. The composition according to any of embodiments 16 to 27, wherein the proportion of the flame retardant (F2) in the composition is in the range from 3% to 15% by weight based on the overall composition.
29. The composition according to any of embodiments 16 to 28, wherein the proportion of the flame retardant (F1) is in the range from 2% to 15% by weight based on the overall composition.
30. The use of a composition according to any of embodiments 16 to 29 for production of cable sheaths.
31. A composition comprising at least one thermoplastic polyurethane, at least melamine cyanurate, at least one first phosphorus-containing flame retardant (F1) selected from the group consisting of alkyl esters of phosphoric acid and alkyl esters of phosphonic acid, where the alkyl radicals are selected from C1 to C12 alkyl radicals, and at least one further phosphorus-containing flame retardant (F2) selected from the group consisting of derivatives of phosphinic acid.
32. The composition according to embodiment 31, wherein the phosphorus-containing flame retardant (F2) is a phosphinate.
33. The composition according to embodiment 32, wherein the phosphinate is selected from the group consisting of aluminum phosphinates and zinc phosphinates.
34. The composition according to any of embodiments 31 to 33, wherein the flame retardant (F1) is selected from the group consisting of methanephosphonates and phosphonates of the general formula (I):

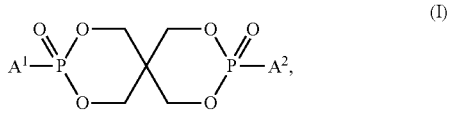
(I)

where $A^1$ and $A^2$ are independently a linear or branched alkyl radical having 1 to 4 carbon atoms.
35. The composition according to any of embodiments 31 to 34, wherein the melamine cyanurate has a particle size in the range from 0.1 to 100 μm.
36. The composition according to any of embodiments 31 to 35, wherein the thermoplastic polyurethane is selected from the group consisting of thermoplastic polyurethanes based on at least one diisocyanate and at least one polycarbonate diol, and thermoplastic polyurethanes based on at least one diisocyanate and polytetrahydrofuran polyol.
37. The composition according to any of embodiments 31 to 36, wherein the thermoplastic polyurethane has an average molecular weight ($M_W$) in the range from 50 000 to 500 000 Da.
38. The composition according to any of embodiments 31 to 37, wherein the thermoplastic polyurethane is based on diphenylmethane diisocyanate (MDI).
39. The composition according to any of embodiments 31 to 38, wherein the thermoplastic polyurethane has a Shore hardness in the range from 80 A to 100 A, determined according to DIN 53505.
40. The composition according to any of embodiments 31 to 39, wherein the proportion of the thermoplastic polyurethane in the composition is in the range from 30% to 75% by weight, based on the overall composition.
41. The composition according to any of embodiments 31 to 40, wherein the proportion of the melamine cyanurate in the composition is in the range from 20% to 40% by weight, based on the overall composition.
42. The composition according to any of embodiments 31 to 41, wherein the proportion of the flame retardant (F2) in the composition is in the range from 3% to 15% by weight, based on the overall composition.
43. The composition according to any of embodiments 31 to 42, wherein the proportion of the flame retardant (F1) is in the range from 2% to 15% by weight based on the overall composition.
44. The use of a composition according to any of embodiments 31 to 43 for production of cable sheaths.

The examples which follow serve to illustrate the invention, but are in no way restrictive with respect to the subject matter of the present invention.

EXAMPLES

The examples show the good mechanical properties have, good flame retardancy properties show, simultaneously good mechanical and chemical stability have, and are additionally discolored to a minor degree, if at all, when subjected to UV radiation.

1. Feedstocks

Elastollan 1185A10: TPU of Shore hardness 85 A from BASF Polyurethanes GmbH, Elastogranstrasse 60, 49448 Lemforde, based on polytetrahydrofuran polyol (PTHF) having a molecular weight of 1000, butane-1,4-diol, MDI.

Melapur MC 15 ED: Melamine cyanurate (1,3,5-triazine-2,4,6(1H,3H,5H)-trione, compound with 1,3,5-triazine-2,4,6-triamine (1:1)), CAS #: 37640-57-6, BASF SE, 67056 Ludwigshafen, GERMANY, particle size D99%<1=50 μm, D50%<=4.5 μm, water content % (w/w)<0.2.

Fyrolflex RDP: Resorcinol bis(diphenylphosphate), CAS #: 125997-21-9, Supresta Netherlands B.V., Office Park De Hoef, Hoefseweg 1, 3821 AE Amersfoort, the Netherlands, viscosity at 25° C.=700 mPas, acid number<0.1 mg KOH/g, water content % (w/w)<0.1.

Exolit OP 1230: Aluminum diethylphosphinate, CAS #: 225789-38-8, Clariant Produkte (Deutschland) GmbH, Chemiepark Knapsack, 50351 Hürth, water content % (w/w)<0.2, average particle size (D50) 20-40 µm.

Chisorb 622 LT: dimethyl butandioate, polymer with 4-hydroxy-2,2,6,6-tetramethyl-1-piperidinethanol, CAS #: 65447-77-0, BASF Polyurethanes GmbH, Postfach 1140, 49440 Lemfoerde, GERMANY.

Tinuvin 234: 2-(2H-benzzotriazol-2-yl)4,6-bis(1-ethyl-1-phenylethylphenol), CAS #: 70321-86-17, BASF SE, 67056 Ludwigshafen, GERMANY.

Disflamoll TOF: tris(2-ethylhexyl) phosphate, CAS #78-42-2, LANXESS Deutschland GmbH, 51369 Leverkusen.

2. Production of the Mixtures

Table 1 below lists compositions in which the individual constituents are stated in parts by weight (PVV). The mixtures were each produced with a Berstorff ZE 40 A twin-screw extruder having a screw length of 35 D divided into 10 barrel sections.

TABLE 1

| Composition | 1 (CE) | 2 (CE) | 3 |
|---|---|---|---|
| 1185A10 | 56.2 | 55 | 55 |
| Disflamoll TOF | | | 5 |
| Fyroflex RDP | 5 | 5 | |
| Melapur 15 ED | 29.8 | 29.8 | 29.8 |
| Exolit OP 1230 | 9 | 9 | 9 |
| Tinuvin 234 | | 0.6 | 0.6 |
| Chisorb 622 LT | | 0.6 | 0.6 |

(CE) comparative example

3. Mechanical Properties

The mixtures were extruded with an Arenz single-screw extruder having a three-zone screw with a mixing section (screw ratio 1:3) to give films having a thickness of 1.6 mm. Density, Shore hardness, tensile strength, tear propagation resistance, abrasion and elongation at break of the corresponding test specimens were measured. All compositions have good mechanical properties. The results are compiled in table 2.

TABLE 2

| Standard mechanical properties | 1 (CE) | 2 (CE) | 3 |
|---|---|---|---|
| Density [g/cm$^3$] | 1.287 | 1.347 | 1.27 |
| Shore A | 92 | 89 | 91 |
| Tensile strength [MPa] | 15 | 14 | 14 |
| Elongation at break [%] | 580 | 520 | 550 |
| Tear propagation resistance [kN/m] | 57 | 55 | 50 |
| Wear [mm$^3$] | 90 | 131 | 97 |

(CE) comparative example

Test Methods:
Density: DIN EN ISO 1183-1, A
Shore hardness A: DIN 53505
Tensile strength: DIN EN ISO 527
Elongation at break: DIN EN ISO 527
Tear propagation resistance: DIN ISO 34-1, B (b
Wear: DIN 53516

4. Discoloration on UV Exposure

The mixtures were extruded with an Arenz single-screw extruder having a three-zone screw with a mixing section (screw ratio 1:3) to give films having a thickness of 1.6 mm. The delta E values (ASTM E313) of the corresponding specimens were measured after various exposure times by the method ASTM G155 Cy4. Lower delta E values were found for the TPU mixtures of the invention.

The results are summarized in table 3.

TABLE 3

| Illumination according to ASTM G155 Cy4 | Time | 1 (CE) | 2 (CE) | 3 |
|---|---|---|---|---|
| Color measurement in reflection (without specular reflection) | 0 h | | | |
| Color separation delta E | | 0 | 0 | 0 |
| Color measurement in reflection (with specular reflection) | 0 h | | | |
| Color separation delta E | | 0 | 0 | 0 |
| Color measurement in reflection (without specular reflection) | 100 h | | | |
| Color separation delta E | | 4.8 | 1.9 | 1.1 |
| Color measurement in reflection (with specular reflection) | 100 h | | | |
| Color separation delta E | | 4.8 | 1.4 | 1.1 |
| Color measurement in reflection (without specular reflection) | 200 h | | | |
| Color separation delta E | | 9.3 | 4.5 | 2.1 |
| Color measurement in reflection (with specular reflection) | 200 h | | | |
| Color separation delta E | | 9.3 | 4.4 | 2.1 |
| Color measurement in reflection (without specular reflection) | 300 h | | | |
| Color separation delta E | | 14.9 | 8 | 3.1 |
| Color measurement in reflection (with specular reflection) | 300 h | | | |
| Color separation delta E | | 15 | 7.5 | 3.1 |

(CE) comparative example

A small value for delta E represents lower discoloration caused by the test. The lower the discoloration in the test, the smaller the discoloration to be expected in practical use, for example under insolation.

The results show that the materials of the invention have improved properties, especially good long-term stability.

The invention claimed is:

1. A composition, comprising:
a thermoplastic polyurethane in a range of from 30 to 75 wt. %, based on total composition weight;
melamine cyanurate;
a first phosphorus-containing flame retardant (F1) which is liquid at 21° C. and comprises an alkyl ester of phosphoric acid and an alkyl ester of phosphonic acid, alkyl radicals of the alkyl esters independently being C1 to C12 alkyl radicals, present in a range of from 2 to 15 wt. % based on the total composition weight; and
a second phosphorus-containing flame retardant (F2) which is a derivative of phosphinic acid, present in a range of from 3 to 15 wt % based on the total composition weight.

2. The composition of claim 1, wherein the second flame retardant (F2) is a phosphinate.

3. The composition of claim 2, wherein the phosphinate comprises an aluminum phosphinate and/or a zinc phosphinate.

4. The composition of claim 1, wherein the first flame retardant (F1) is a trialkyl phosphate independently comprising C1 to C12 alkyl radicals.

5. The composition of claim 1, wherein the first flame retardant (F1) comprises a phosphonate of formula (I):

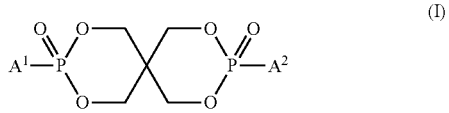 (I)

wherein $A^1$ and $A^2$ are each independently a linear or branched alkyl radical having 1 to 4 carbon atoms.

6. The composition of claim 1, wherein the melamine cyanurate has a particle size in a range of from 0.1 to 100 µm.

7. The composition of claim 1, wherein the thermoplastic polyurethane comprises a thermoplastic polyurethane comprising, in polymerized form, (i) a diisocyanate and (ii-a) a polycarbonatediol or (ii-b) polytetrahydrofuran polyol.

8. The composition of claim 1, wherein the thermoplastic polyurethane has a mean molecular weight ($M_W$) in a range of from 50,000 to 500,000 Da.

9. The composition of claim 1, wherein the thermoplastic polyurethane comprises, in polymerized form, diphenylmethane diisocyanate (MDI).

10. The composition of claim 1, wherein the thermoplastic polyurethane has a Shore hardness in a range of from 80 A to 100 A, determined in accordance with DIN 53505.

11. The composition of claim 1, wherein the thermoplastic polyurethane is present up to 60 wt. % of the total composition weight.

12. The composition of claim 1, wherein the melamine cyanurate is present in a range of from 20% to 40 wt. %, based on the total composition weight.

13. A cable sheath, comprising the composition of claim 1.

14. The composition of claim 1, wherein the first flame retardant (F1) comprises a trialkyl phosphate.

15. The composition of claim 1, wherein the melamine cyanurate is present in a range of from 25 to 40 wt. %, based on the total composition weight.

16. The composition of claim 1, wherein the melamine cyanurate is present in a range of from 30 to 40 wt. %, based on the total composition weight.

17. The composition of claim 1, comprising the flame retardant (F1) in an amount of from 3 to 10 wt. %, based on the total composition weight.

18. The composition of claim 11, comprising the flame retardant (F1) in an amount of from 5 to 8 wt. %, based on the total composition weight.

19. The composition of claim 1, wherein the thermoplastic polyurethane has a Shore hardness in a range of from 55 to 75 D, determined in accordance with DIN 53505.

20. The composition of claim 18, comprising the flame retardant (F2) in an amount of from 9 to 11 wt. %, based on the total composition weight.

* * * * *